US012504155B2

(12) United States Patent
Yang

(10) Patent No.: US 12,504,155 B2
(45) Date of Patent: Dec. 23, 2025

(54) FINGER LAMP STRUCTURE

(71) Applicant: CHANGZHOU ZHANLU PLASTIC TECHNOLOGY CO., LTD., Changzhou (CN)

(72) Inventor: Zhen Yang, Changzhou (CN)

(73) Assignee: CHANGZHOU ZHANLU PLASTIC TECHNOLOGY CO., LTD., Changzhou (CN)

( * ) Notice: Subject to any disclaimer, the term of this patent is extended or adjusted under 35 U.S.C. 154(b) by 0 days.

(21) Appl. No.: 19/000,857

(22) Filed: Dec. 24, 2024

(65) Prior Publication Data

US 2025/0137627 A1 May 1, 2025

Related U.S. Application Data

(63) Continuation of application No. PCT/CN2023/093873, filed on May 12, 2023.

(30) Foreign Application Priority Data

Jun. 30, 2022 (CN) ......................... 202221682057.0
Jun. 30, 2022 (CN) ......................... 202221717313.5

(51) Int. Cl.
*F21V 21/088* (2006.01)
*F21L 4/00* (2006.01)
(Continued)

(52) U.S. Cl.
CPC .......... *F21V 21/0885* (2013.01); *F21L 4/005* (2013.01); *F21V 19/007* (2013.01);
(Continued)

(58) Field of Classification Search
CPC .. F21V 21/0885; F21V 19/007; F21V 21/145; F21V 23/001; F21V 23/0414; F21L 4/005; F21Y 2101/00
See application file for complete search history.

(56) References Cited

U.S. PATENT DOCUMENTS 7,165,859 B1 * 1/2007 Munari ............... F21V 21/0885 362/104
7,703,937 B2 * 4/2010 Shirey ....................... F21L 4/00 362/183

(Continued)

FOREIGN PATENT DOCUMENTS

CN 202382109 U 8/2012
CN 109832732 A 6/2019
JP 2005235405 A 9/2005

*Primary Examiner* — Bao Q Truong
(74) *Attorney, Agent, or Firm* — Nitin Kaushik

(57) ABSTRACT

The present disclosure relates to the technical field of portable lighting, in particular to a finger lamp structure. The finger lamp structure includes a finger sleeving member, wherein the finger sleeving member has a section of a closable or closed annular structure and is sleeved on a finger and provided with a mounting base on an outer surface in a circumferential direction; a lamp holder, wherein the lamp holder is detachably connected to the mounting base, and the lamp holder is rotationally connected to the mounting base in a damping rotation connection manner; and a lamp bead, which is fixed on the lamp holder, wherein the size of an inner wall of the finger sleeving member that wraps the finger can be adjusted.

11 Claims, 13 Drawing Sheets

(51) Int. Cl.

| | |
|---|---|
| ***F21V 19/00*** | (2006.01) |
| ***F21V 21/14*** | (2006.01) |
| ***F21V 23/00*** | (2015.01) |
| ***F21V 23/04*** | (2006.01) |
| *F21Y 101/00* | (2016.01) |

(52) U.S. Cl.
CPC .......... *F21V 21/145* (2013.01); *F21V 23/001* (2013.01); *F21V 23/0414* (2013.01); *F21Y 2101/00* (2013.01)

(56) References Cited

U.S. PATENT DOCUMENTS

| | | | | |
|---|---|---|---|---|
| 9,488,349 | B2 * | 11/2016 | Farina | H04N 23/56 |
| 2007/0047223 | A1 * | 3/2007 | Mundhra | F21L 4/00 362/103 |
| 2016/0223170 | A1 * | 8/2016 | Farina | H04N 23/50 |
| 2021/0215333 | A1 * | 7/2021 | Eltorai | F21V 23/0414 |

* cited by examiner

FINGER LAMP STRUCTURE

CROSS-REFERENCE TO RELATED APPLICATIONS

The application claims priority to Chinese patent application No. 202221682057.0, filed on Jun. 30, 2022 and Chinese patent application No. 202221717313.5, filed on Jun. 30, 2022, the entire contents of which are incorporated herein by reference.

TECHNICAL FIELD

The present disclosure relates to the technical field of portable lighting, in particular to a finger lamp structure.

BACKGROUND

As shown in FIG. 1, a finger lamp is a mini portable lamp that can be sleeved directly on the finger and used by turning on a switch. The finger lamp can illuminate in the dark. The finger lamp may be applied in a variety of application scenarios, such as a writing scenario in FIG. 1; may also be applied in surgical lighting; or can increase the atmosphere sense at dance events, etc.

In related technologies known to utility model inventors, as shown in FIG. 2, a finger lamp mostly includes a finger sleeve 01 sleeved on the finger and a lamp holder 02 fixed on the top of the finger sleeve. In order to adapt to different finger circumferences, the finger sleeve 01 is configured as a deformable constricted structure in the related technologies. However, in order to facilitate the assembly of the lamp holder 02, the lamp holder is slidably clamped on the finger sleeve 01 in the related technologies.

However, it was found by utility model inventors during implementation of the above solutions that a lamplight irradiation direction of the above technical solution cannot be adjusted and the finger sleeve cannot be fixed reliably. When worn by people with thinner fingers, the finger sleeve is easy to slip, but when worn by people with thicker fingers, is easy to slip off.

The information disclosed in this background section is only intended to deepen the understanding of the overall Background of the present disclosure, and should not be regarded as acknowledging or implying in any form that this information constitutes the prior art known to those skilled in the art.

SUMMARY

In view of at least one of the above technical problems, the present disclosure provides a finger lamp structure, which adopts a rotatable connection of a lamp holder and adjustable setting of a finger sleeving member so as to improve the adaptability of the finger lamp.

According to an aspect of the present disclosure, a finger lamp structure is provided. The finger lamp structure includes:

- a finger sleeving member, wherein the finger sleeving member has a section of a closable or closed annular structure and is sleeved on a finger and provided with a mounting base on an outer surface in a circumferential direction;
- a lamp holder, wherein the lamp holder is detachably connected to the mounting base, and the lamp holder is rotationally connected to the mounting base in a damping rotation connection manner; and
- a lamp bead, which is fixed on the lamp holder, wherein the size of an inner wall of the finger sleeving member that wraps the finger can be adjusted.

Further, a light-emitting part of the lamp bead protrudes from an outer surface of the lamp holder.

In some embodiments of the present disclosure, the finger sleeving member is made of a rubber material; the mounting base is provided with a circular mounting groove; and the bottom of the circular mounting groove extends in all directions to form a circular limiting groove;

- a connecting column that matches the circular mounting groove is arranged at the bottom of the lamp holder, and a limiting flange that matches the circular limiting groove is arranged at the bottom of the connecting column; and
- the dimensional accuracy of the circular limiting groove and the limiting flange meets accuracy requirements of the detachable installation and damping rotation connection of the lamp holder.

In some embodiments of the present disclosure, the lamp holder includes a first half shell and a second half shell which are assembled with each other; and matching step surfaces are provided on docking surfaces of the first half shell and the second half shell.

In some embodiments of the present disclosure, one of two docking surfaces of the limiting flange is provided with a limiting column that extends toward the other surface, and the other surface is provided with a limiting hole; and when the first half shell is docked with the second half shell, the limiting column penetrates into the limiting hole.

In some embodiments of the present disclosure, one of the docking surfaces of the first half shell and the second half shell is also provided with a guide wall that extends toward an inner wall of the other surface, and a section of a free end of the guide wall is wedge-shaped.

In some embodiments of the present disclosure, the finger sleeving member is of a closable annular structure and includes a first connecting belt connected to one end of the mounting base and a second connecting belt connected to the other end of the mounting base; and

- a fastener is arranged at a free end of the second connecting belt, the first connecting belt is connected to the fastener, and at least one of contact surfaces between the fastener and the first connecting belt has non-slip ridges to achieve a damping connection between the first connecting belt and the second connecting belt.

In some embodiments of the present disclosure, the fastener is a fixed frame fixed on an inner wall of the free end of the second connecting belt, the first connecting belt penetrates into the fixed frame, and a penetration distance is adjustable.

In some embodiments of the present disclosure, the fastener is a sliding block fixed on the inner wall of the free end of the second connecting belt; an outer wall of the first connecting belt is provided with a sliding groove that extends in its length direction; the sliding block is embedded into the sliding groove, and a position of the sliding block in the sliding groove is adjustable; and cross sections of the sliding groove and the sliding block are of a "convex" structure.

In some embodiments of the present disclosure, the finger sleeving member is of a closed annular structure, and an inner wall of the finger sleeving member is evenly distributed with elastic supporting plates, which extend toward the center, in the circumferential direction; and the elastic supporting plates undergo expansion, contraction or bending elastic deformation when in contact with fingers of different sizes.

In some embodiments of the present disclosure, the finger sleeving member is a closed-loop annular structure, and the inner wall of the finger sleeving member is evenly distributed with elastic supporting belts in the circumferential direction; both ends of each elastic supporting belt are vertically connected to the inner wall of the finger sleeving member, and the middle part of the elastic supporting belt is of an arc-shaped structure that recesses in a direction away from the center of the circle; and when the middle parts of the elastic supporting belts are in contact with fingers of different sizes, the elastic supporting belts undergo an elastic deformation.

Further, the lamp holder is of an internal hollow structure; an opening that is of an internal hollow structure is formed in the bottom of the lamp holder; the lamp holder is divided into a lamp holder main body and a mounting plug-in plate which are of an integrated structure; the lamp holder main body is provided with a lamp bead mounting groove; the lamp bead mounting groove extends downward from a mounting position of the lamp bead and opens at the bottom of the lamp holder; plug-in matching structures that cooperate with each other are arranged at both sides of the lamp bead mounting groove and both sides of the mounting plug-in plate; the lamp bead is mounted into the lamp holder through the lamp bead mounting groove; the mounting plug-in plate is inserted into the lamp holder mounting groove from an open end of the lamp bead mounting groove to form the lamp holder and to mount and position the lamp bead; and the internal hollow structure of the lamp holder is filled with packaging glue to fix the lamp bead and a connecting wire.

The present disclosure has the following beneficial effects: according to the present disclosure, the lamp holder is detachably fixed on the mounting base of the finger sleeving member in a damping rotation connection mode, such that rotation of the lamp bead in an irradiation direction is achieved. A user can adjust an irradiation direction of lamplight according to needs. The finger sleeving member can be worn on fingers of different sizes through the adjustable setting of an inner diameter, thereby improving the applicability of the finger lamp. Therefore, the finger lamp structure can be applied to various use scenarios.

BRIEF DESCRIPTION OF DRAWINGS

To describe the embodiments of the present disclosure or the technical solutions in the prior art more clearly, the following briefly introduces the accompanying drawings required for describing the embodiments or the descriptions in the prior art. Apparently, the accompanying drawings in the following description show merely some embodiments of the present disclosure, and a person of ordinary skill in the art may still derive other drawings from these accompanying drawings without creative efforts.

Figure 1:
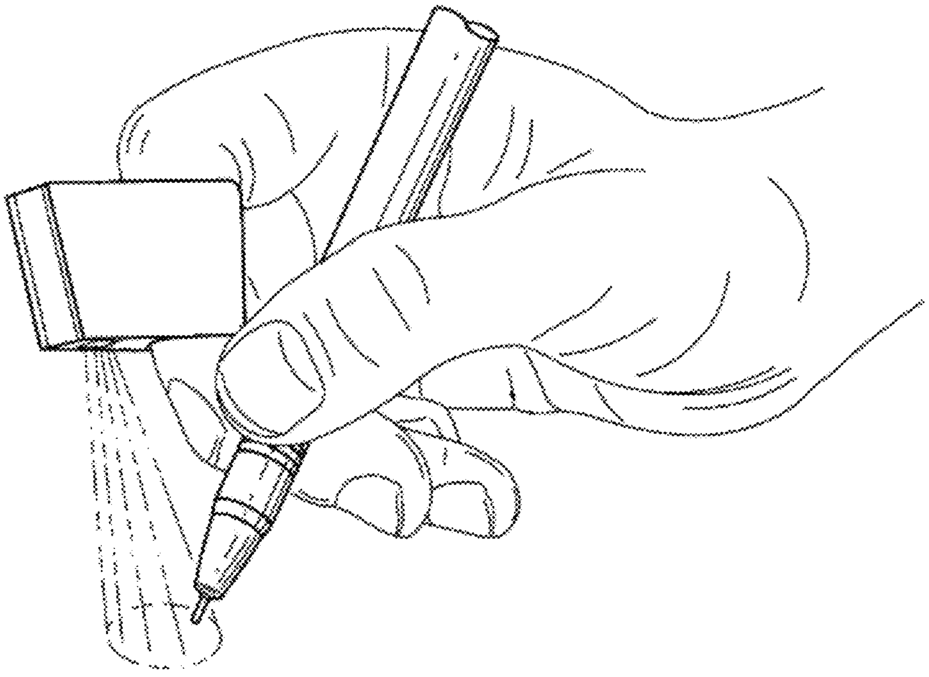
FIG. 1 is a schematic diagram of a use scenario of a finger lamp in the Background of the present disclosure.
Figure 2:
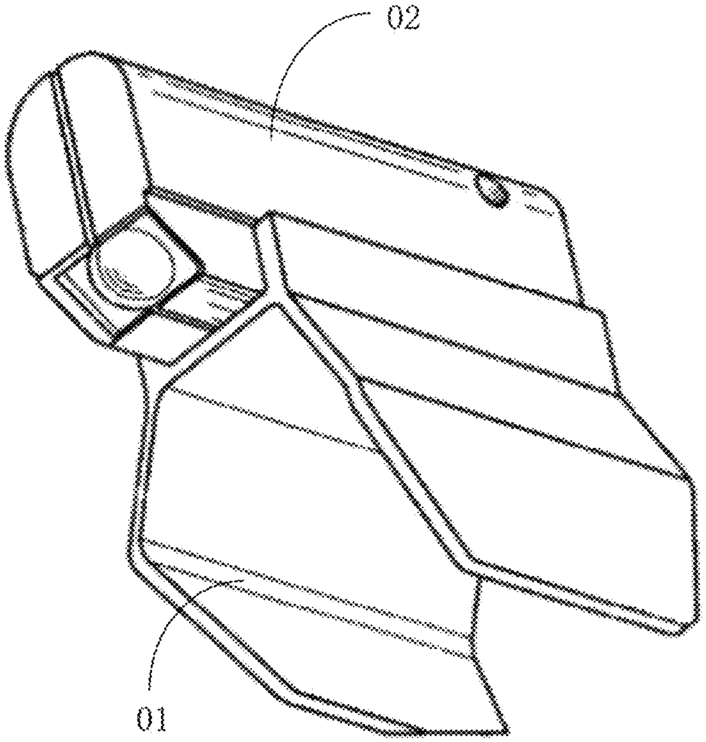
FIG. 2 is a schematic structural diagram of the finger lamp in the Background of the present disclosure.

In the drawings: 10—finger sleeving member; 11—mounting base; 11*a*—circular mounting groove; 11*b*—circular limiting groove; 12—first connecting belt; 12*a*—non-slip ridge; 13—second connecting belt; 13*a*—fastener; 14—elastic supporting plate; 15—elastic supporting belt; 20—lamp holder; 20*a*—connecting column; 20*b*—limiting flange; 21—first half shell; 22—second half shell; 22*a*—step surface; 22*b*—limiting column; 22*c*—limiting hole; 22*d*—guide wall; 24—lamp holder main body; 24*a*—lamp bead mounting groove; 25—mounting plug-in plate; 25*a*—convex rib; 30—lamp bead; 40—connecting wire; 50—power storage compartment; 51*a*—touch control switch; and 53—wrist strap.

DETAILED DESCRIPTION OF THE EMBODIMENTS

The technical solutions in the embodiments of the present disclosure will be described clearly and completely below in conjunction with accompanying drawings in the embodiments of the present disclosure. Of course, the described embodiments are merely some embodiments, rather than all embodiments, of the present disclosure.

It should be noted that when an element is referred to as being "fixed to" another element, it may be directly located on the other element, or an intermediate element may also exist. When an element is referred to as being "connected to" another element, it may be directly connected to the other element, or an intermediate element exists at the same time. The terms "vertical", "horizontal", "left", "right" and similar expressions used herein are for the purpose of illustration, but are not intended to be the sole embodiment.

Unless otherwise defined, all technical and scientific terms used herein have the same meaning as commonly understood by a person of ordinary skill in the art. The terms used in the description of the present disclosure are only for the purpose of describing specific examples, and are not intended to limit the present disclosure. The term "and/or" as used herein includes any and all combinations of one or more related listed items.

In order to solve the problems of unreliable connection between the finger lamp and the finger and poor applicability of fixation in a lamplight direction in the prior art, the embodiments of the present disclosure provide a solution that achieves damping rotation connection of a lamp holder and adjustability of a finger sleeving member to improve the applicability of a finger lamp. The embodiments of the present disclosure will be described in detail below.

Embodiment 1

A finger lamp structure shown in FIG. 3 to FIG. 7 includes a finger sleeving member 10 for connecting with a finger, a lamp holder 20 rotatably connected to the finger sleeving member 10, and a lamp bead 30 fixed on the lamp holder 20.

In this embodiment of the present disclosure, the finger sleeving member 10 has two forms, one of which is of a closable annular structure similar to a watch wrist strap, and the other of which is of a circular structure that is directly sleeved on the finger like a ring. Of course, it should be pointed out here that the annular structure here is not strictly limited, and a form in which the finger sleeving member 10 is fixed on the finger can be regarded as the annular structure in this embodiment of the present disclosure. The first closable structure form will be first introduced below.

Figure 3:
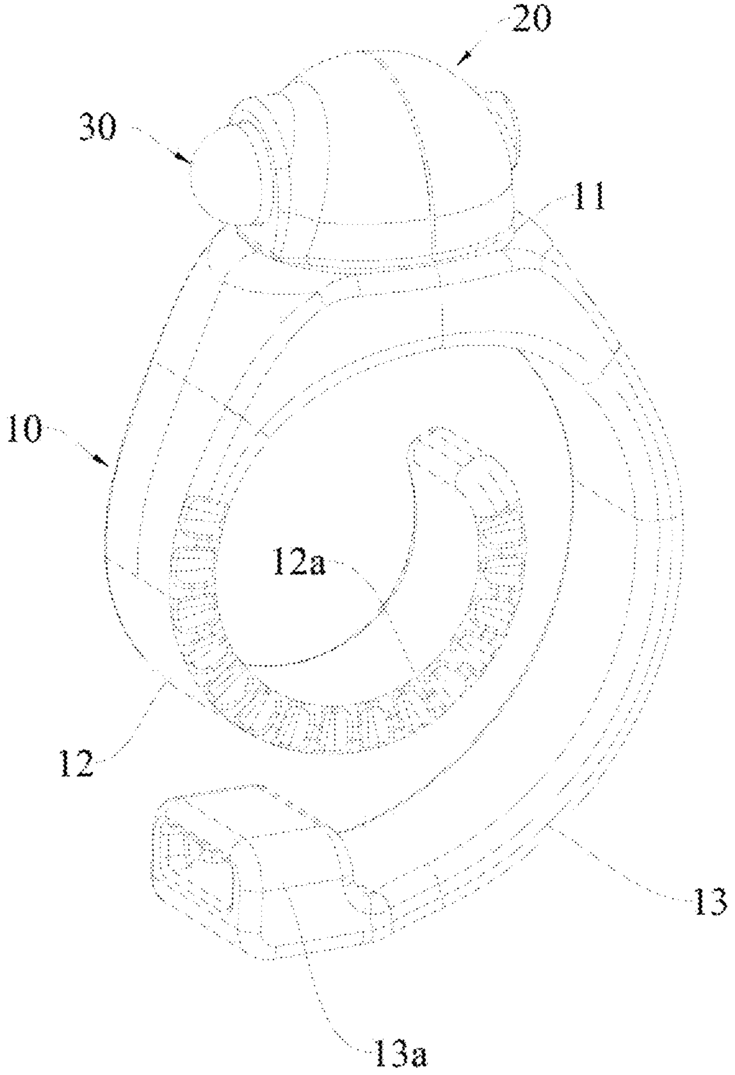
FIG. 3 is a schematic diagram of a finger lamp structure in Embodiment 1 of the present disclosure.
Figure 4:
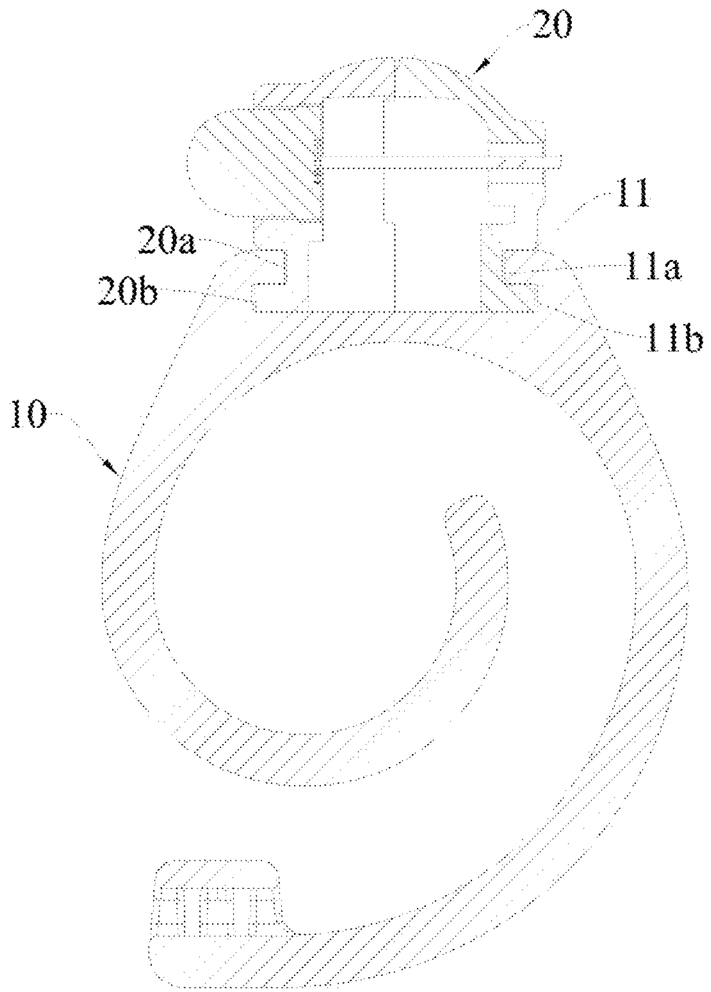
FIG. 4 is a vertical sectional view of FIG. 3 in Embodiment 1 of the present disclosure.

As shown in FIG. 3 and FIG. 4, an outer surface of the finger sleeving member 10 in a circumferential direction is provided with a mounting base 11. In this embodiment of the present disclosure, the mounting base 11 is a connection structure similar to a watch dial arranged on the finger sleeving member 10, and forms an integrally formed structure together with the finger sleeving member 10 for the installation of the lamp holder 20.

The lamp holder 20 is detachably connected to the mounting base 11 in a damping rotation connection manner. It should be pointed out here that the damping rotation connection means that the lamp holder 20 can rotate when a force is applied to the mounting base 11, and the lamp holder 20 will stop at a rotating position when the force application is stopped. The detachable connection and the damping rotation connection have a variety of implementations in this embodiment of the present disclosure, which may, for example, be a connection through a damping rotating shaft in one implementation of the present disclosure, or a detachable damping rotation connection through deformations of silicone or other rubber materials and a contact friction force.

The lamp bead 30 is fixed on the lamp holder 20, and a light-emitting part of the lamp bead 30 protrudes from an outer surface of the lamp holder 20. In this embodiment of the present disclosure, the form of the lamp bead 30 and an axis direction are not limited. A person skilled in the art may perform fixation and direction setting on the lamp bead 30 as needed. The above-mentioned structure forms all fall within the protection scope of the present disclosure.

In this embodiment of the present disclosure, the size of an inner wall of the finger sleeving member 10 that wraps the finger can be adjusted. The size-adjustable setting here refers to adjusting the size of the inner wall of the finger sleeving member 10 according to a circumference of the user's finger, so as to improve the adaptability of the finger lamp. In an implementation of the present disclosure, the specific adjustment is achieved by adjusting a relative distance of a wrist strap, which will be described in detail below.

In the above implementation, the lamp holder 20 is detachably fixed on the mounting base 11 of the finger sleeving member 10 in a damping rotation connection mode, such that rotation of the lamp bead 30 in an irradiation direction is achieved. A user can adjust an irradiation direction of lamplight according to needs. The finger sleeving member 10 can be worn on fingers of different sizes through the adjustable setting of an inner diameter, thereby improving the applicability of the finger lamp. Therefore, the finger lamp structure can be applied to various use scenarios.

Based on the above embodiment, as shown in FIG. 4, the finger sleeving member 10 is made of a rubber material; the mounting base 11 is provided with a circular mounting groove 11*a*; the bottom of the circular mounting groove 11*a* extends in all directions to form a circular limiting groove 11*b*; a connecting column 20*a* that matches the circular mounting groove 11*a* is arranged at the bottom of the lamp holder 20, and a limiting flange 20*b* that matches the circular limiting groove 11*b* is arranged at the bottom of the connecting column 20*a*; and the dimensional accuracy of the circular limiting groove 11*b* and the limiting flange 20*b* meets accuracy requirements of the detachable installation and damping rotation connection of the lamp holder 20. During specific installation or disassembly, because the rubber has a certain elasticity, the match between the limiting flange 20*b* and the circular limiting groove 11*b* can be realized by means of direct pull-out or plug-in. Since it is a rubber material, for example, a silica gel material, there is a friction force between the connecting column 20*a* and the circular mounting groove 11*a* and between the limiting flange 20*b* and the circular limiting groove 11*b* when it rotates, thereby forming a detachable structure of the damping rotation connection. Through the arrangement of the above-mentioned structure form, the machining process is simple, the irradiation direction of the lamp bead 30 can be changed, which is also convenient for the installation and disassembly of the lamp holder 20.

Figure 5:
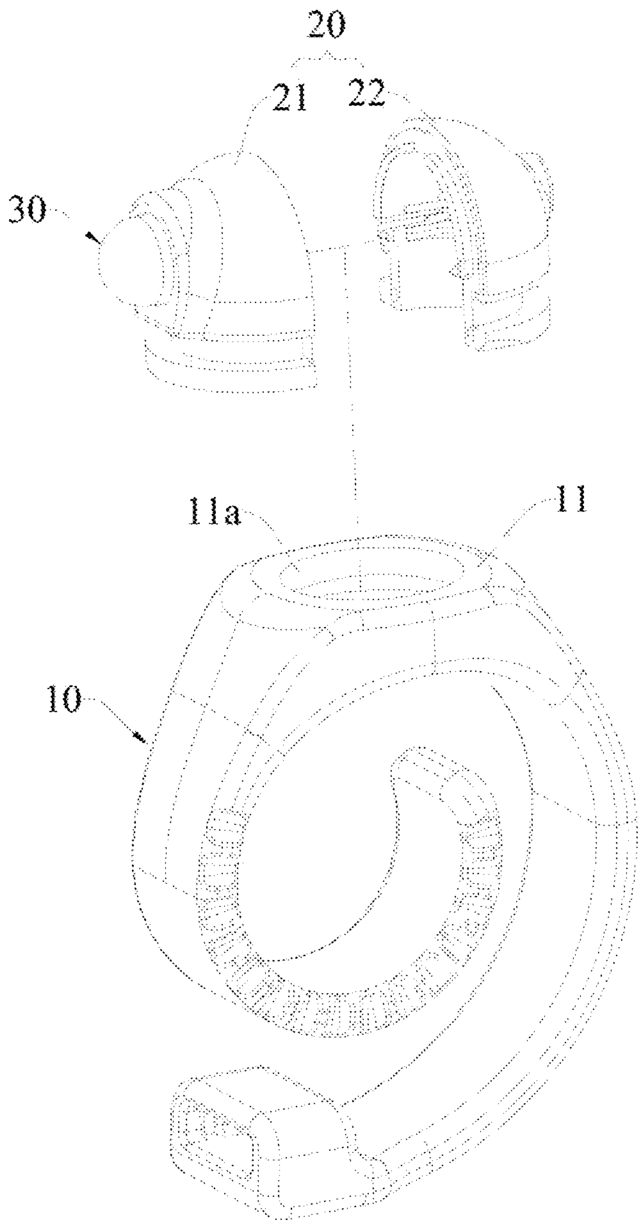
FIG. 5 is a schematic diagram of an exploded structure of FIG. 3 in Embodiment 1 of the present disclosure.

In this embodiment of the present disclosure, the lamp holder 20 is made of hard rubber, so as to facilitate the protection of the internal lamp bead 30 and also the installation and disassembly on the mounting base 11. As shown in FIG. 5, the lamp holder 20 includes a first half shell 21 and a second half shell 22 which are assembled with each other; and matching step surfaces 22*a* are provided on docking surfaces of the first half shell 21 and the second half shell 22. Through the above-mentioned arrangement, when the lamp bead 30 is damaged and needs to be repaired, only the lamp holder 20 needs to be disassembled from the mounting base 11. That is, the lamp bead 30 can be repaired and replaced, thereby prolonging the service life of the product. In addition, through the arrangement of the step surfaces 22*a*, the assembly accuracy of the lamp holder 20 and the mounting base 11 is improved, the light leakage of the docking surfaces can also be prevented, and the reliability of the product is ensured.

Figure 6:
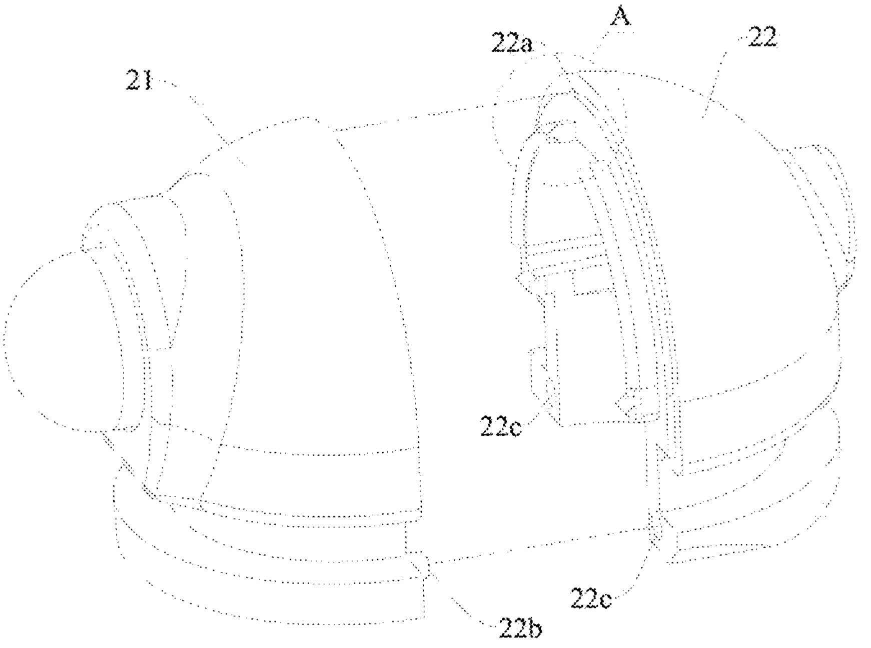
FIG. 6 is a schematic diagram of an exploded structure of a lamp holder in Embodiment 1 of the present disclosure.

As shown in FIG. 6, in this embodiment of the present disclosure, since the lamp holder 20 is of an assembled structure, in order to ensure the stability in rotation, one of two docking surfaces of the limiting flange 20*b* is provided with a limiting column 22*b* that extends toward the other surface, and the other surface is provided with a limiting hole 22*c*; and when the first half shell 21 is docked with the second half shell 22, the limiting column 22*b* penetrates into the limiting hole 22*c*. In this way, through the arrangement of the limiting column 22*b* and the limiting hole 22*c*, the limiting column 22*b* and the limiting hole 22*c* have good stress integrity as the lamp holder 20 rotates, without separation in the rotation process.

Figure 7:
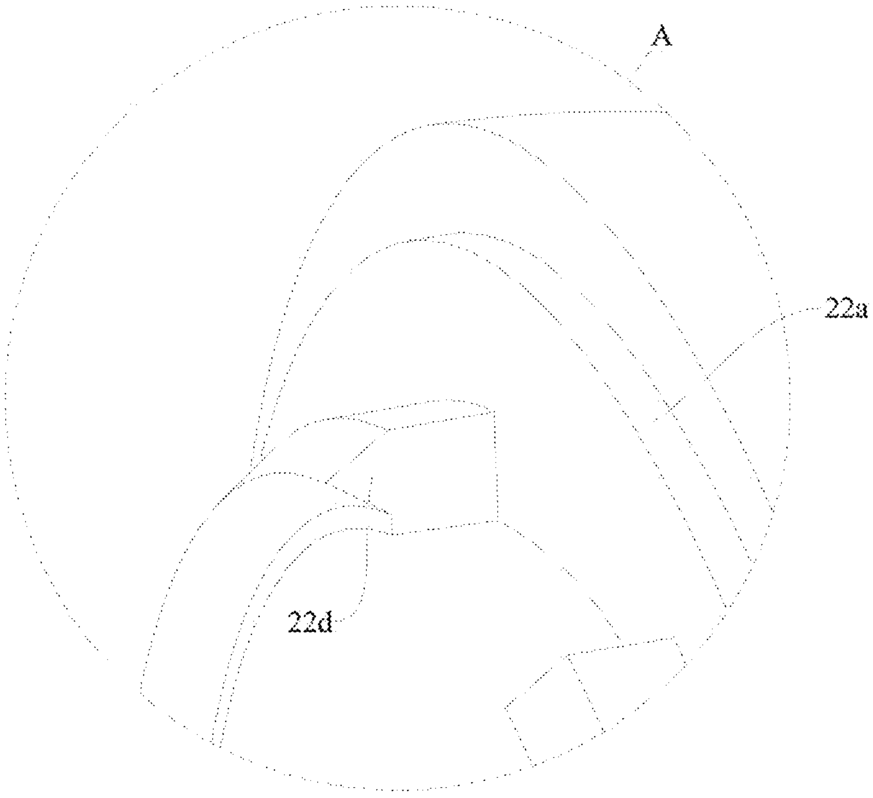
FIG. 7 is a locally enlarged view at Part A in FIG. 6 in Embodiment 1 of the present disclosure.

Further, referring to FIG. 6 and FIG. 7, in this embodiment of the present disclosure, one of the docking surfaces of the first half shell 21 and the second half shell 22 is also provided with a guide wall 22*d* that extends toward an inner wall of the other surface, and a section of a free end of the guide wall 22*d* is wedge-shaped. Through the above-mentioned form, when the first half shell 21 is docked with the second half shell 22, the convenience in docking is improved through the guide of the guide wall 22*d*, thereby improving the machining efficiency.

A closable annular structure of the finger sleeving member is shown in FIG. 3. In this embodiment of the present disclosure, the finger sleeving member 10 includes a first connecting belt 12 connected to one end of the mounting base 11 and a second connecting belt 13 connected to the other end of the mounting base 11; and a fastener 13*a* is arranged at a free end of the second connecting belt 13, the first connecting belt 12 is connected to the fastener 13*a*, and at least one of contact surfaces between the fastener 13*a* and the first connecting belt has non-slip ridges 12*a* to achieve a damping connection between the first connecting belt 12 and the second connecting belt 13. In this way, through the arrangement of the fastener 13*a*, the connection between the first connecting belt 12 and the second connecting belt 13 is formed, thereby forming a closed structure. Through the damping connection, the size of the closed structure can be further adjusted by changing the connection position, thereby achieving the wear for different fingers.

Specifically, continuously referring to FIG. 3, in one implementation of the present disclosure, the fastener 13*a* is a fixed frame fixed on an inner wall of the free end of the second connecting belt 13, the first connecting belt 12 penetrates into the fixed frame, and a penetration distance is adjustable. Each of both side walls of the fixed frame is provided with non-slip ridges 12*a* that are uniformly distributed at equal intervals, such that reliable fixation without slip is achieved by means of a fastening connection of the non-slip ridges 12*a* and the grooves therebetween. In need of adjustment, different sizes of the inner walls can be adjusted by pulling or pushing by an external force.

Embodiment 2

Figure 8:
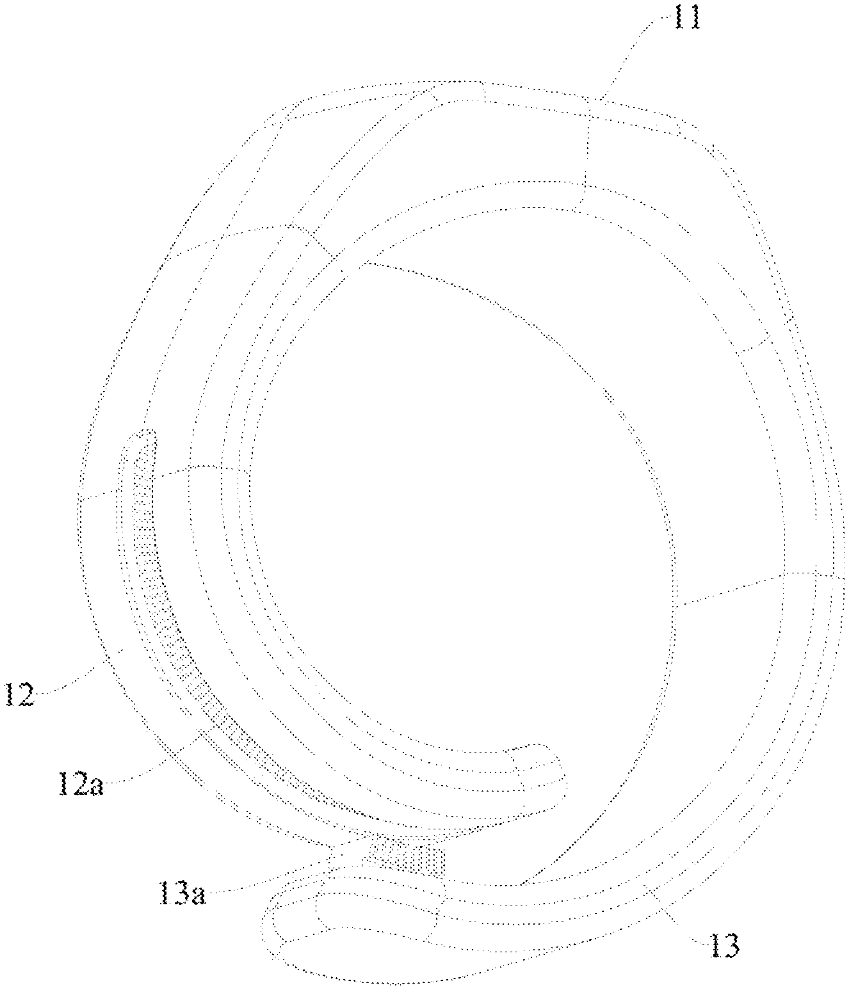
FIG. 8 is a schematic structural diagram of a finger sleeving member in Embodiment 2 of the present disclosure.

In a second implementation of the present disclosure, a specific connection form of the first connecting belt 12 and the second connecting belt 13 is improved, and the other structure form and connection mode of the lamp holder 20 and the mounting base 11 are both the same as those in Embodiment 1, which will not be repeated here. Only the structure form of the finger sleeving member 10 is introduced. In the second implementation, a closable connection form is still adopted. As shown in FIG. 8, the fastener is a sliding block fixed on the inner wall of the free end of the second connecting belt 13; an outer wall of the first connecting belt 12 is provided with a sliding groove that extends in its length direction; the sliding block is embedded into the sliding groove, and a position of the sliding block in the sliding groove is adjustable; and cross sections of the sliding groove and the sliding block are of a "convex" structure. During specific connection, the sliding block is embedded into the sliding groove with an external force. Both side walls of the slide block and inner walls on both sides of the sliding groove are also provided with the same non-slip ridges 12*a* as Embodiment 1. A direction of the non-slip ridges 12*a* is perpendicular to a sliding direction of the sliding block, then the damping connection is realized through the same principle as Embodiment 1, and the size of the inner wall of the finger sleeving member 10 is adjusted.

Embodiment 3

Figure 9:
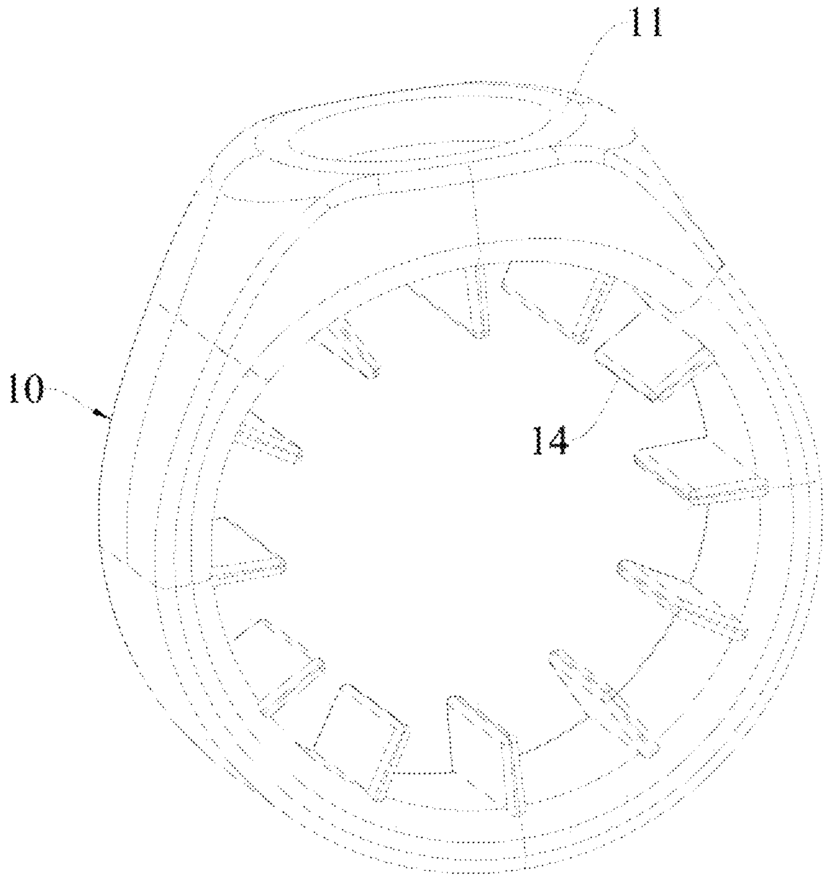
FIG. 9 is a schematic structural diagram of a finger sleeving member in Embodiment 3 of the present disclosure.

In third and fourth embodiments of the present disclosure, the finger sleeving member 10 is a closed annular structure, and this structure form is easy to machine and form. As shown in FIG. 9, the inner wall of the finger sleeving member 10 in this embodiment of the present disclosure is evenly distributed with elastic supporting plates 14, which extend toward the center, in a circumferential direction; an extension direction of the elastic supporting plates 14 is a radial direction; and the elastic supporting plates 14 undergo expansion, contraction or bending elastic deformation when in contact with fingers of different sizes. In this way, through the deformation of the elastic supporting plates 14, the elastic supporting plates 14 are less deformed when being sleeved on thinner fingers. Through the support from the plurality of supporting plates, the reliable connection with the finger is achieved. The elastic supporting plates 14 are greatly deformed when the fingers are relatively thick, which may also ensure reliable wear.

Embodiment 4

Figure 10:
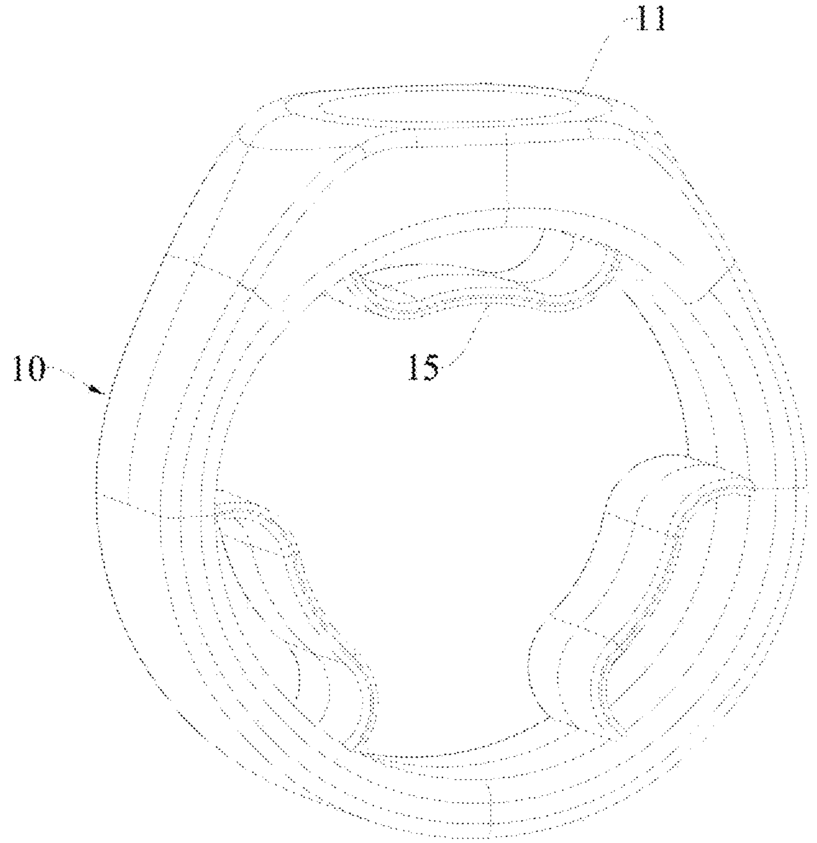
FIG. 10 is a schematic structural diagram of a finger sleeving member in Embodiment 4 of the present disclosure.

In the fourth embodiment of the present disclosure, in order to improve the comfort of wear, the elastic supporting plates 14 are replaced with elastic supporting belts 15. As shown in FIG. 10, the finger sleeving member 10 is a closed annular structure, and the inner wall of the finger sleeving member 10 is evenly distributed with elastic supporting belts 15 in the circumferential direction; both ends of each elastic supporting belt 15 are vertically connected to the inner wall of the finger sleeving member 10, and the middle part of the elastic supporting belt 15 is of an arc-shaped structure that recesses in a direction away from the center of the circle; and when the middle parts of the elastic supporting belts 15 are in contact with fingers of different sizes, the elastic supporting belts 15 undergo an elastic deformation. In this way, during specific connection, a middle arc-shaped structure of each elastic supporting belt 15 is in contact with the finger. Depending on the thicknesses of the fingers, the deformation degrees of the middle arc-shaped structures also vary. Through the above-mentioned mode, the contact area with the finger is increased, and the comfort and reliability of wear are improved.

In addition, it should be pointed out here that in the above-mentioned implementation of the present disclosure, a light-emitting structure of the lamp bead 30 is not limited. A person skilled in the art may provide conventional electronic devices such as batteries and switches in the lamp holder 20. In other ways, battery switches, etc. may also be arranged on the outside by means of wiring harness connection. The above embodiments fall within the protection scope of the present disclosure.

Embodiment 5

Figure 11:
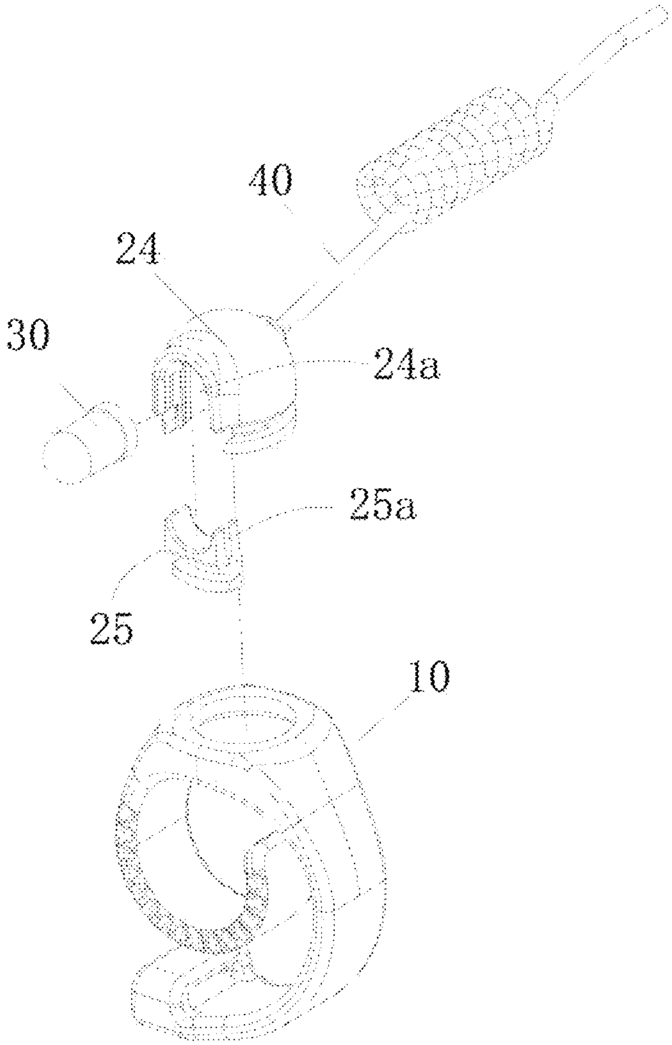
FIG. 11 is a schematic diagram of an exploded structure of a finger lamp structure in Embodiment 5 of the present disclosure.
Figure 12:
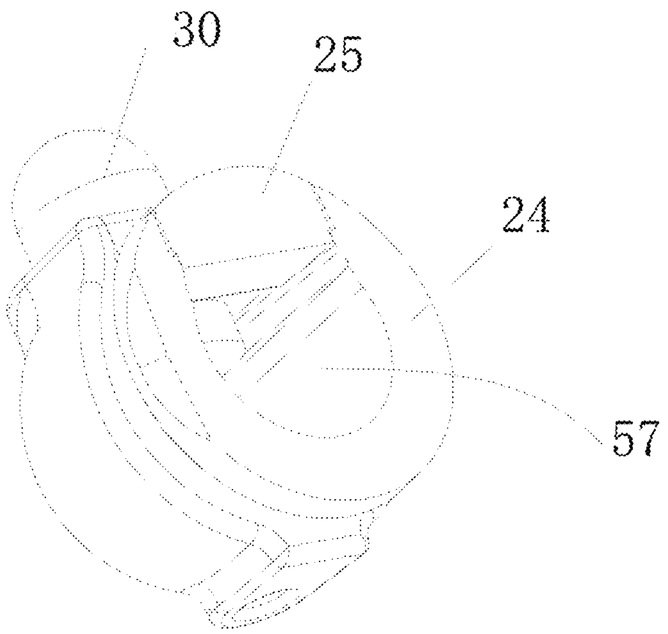
FIG. 12 is a schematic structural diagram of the bottom of the lamp holder in Embodiment 5 of the present disclosure.
Figure 13:
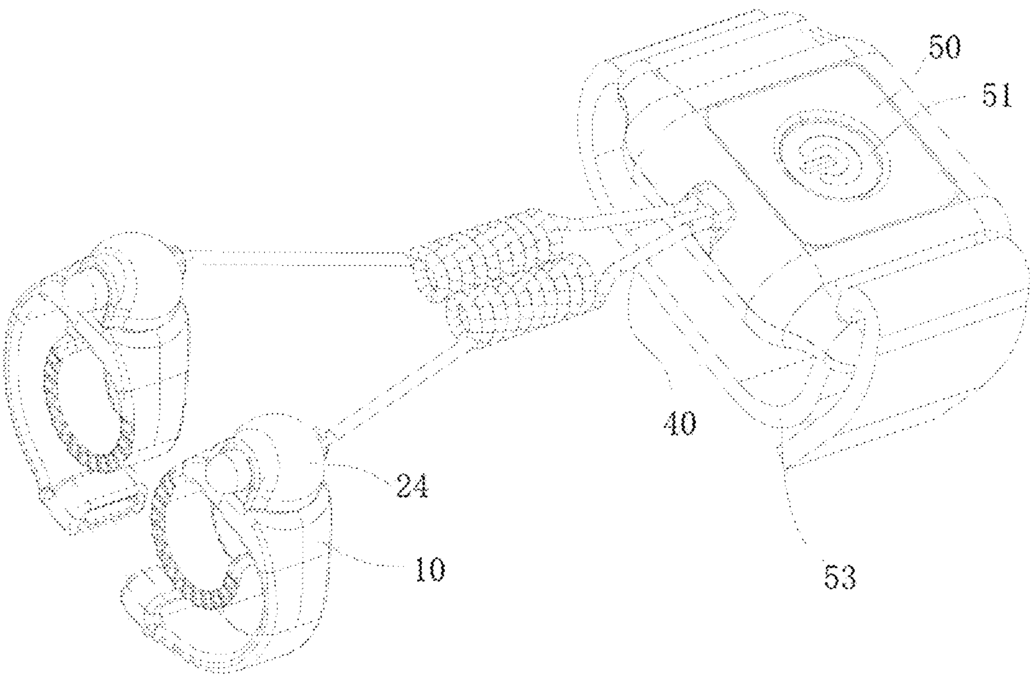
FIG. 13 is a schematic diagram of an overall structure of a finger flashlight of the finger lamp structure in Embodiment 5 of the present disclosure.

As shown in FIGS. 11 to 13, Embodiment 5 of the present disclosure is basically the same as Embodiment 1, in which the lamp holder 20 is of an internal hollow structure, and a base opening 57 which is of an internal hollow structure is formed in the bottom of the lamp holder 20. Both side walls of the first connecting belt 12 and both side walls of the fastener 13*a* are both provided with the non-slip ridges 12*a*. But the difference lies in that: the lamp holder 20 is divided into a lamp holder main body 24 and a mounting plug-in plate 25 which are of an integrated structure; the lamp holder main body 24 is provided with a lamp bead mounting groove 24*a*; the lamp bead mounting groove 24*a* extends downward from a mounting position of the lamp bead 30 and opens at the bottom of the lamp holder 20; plug-in matching structures that cooperate with each other are arranged at both sides of the lamp bead mounting groove 24*a* and both sides of the mounting plug-in plate 25; the lamp bead 30 is mounted into the lamp holder main body 24 through the lamp bead mounting groove 24*a*; the mounting plug-in plate 25 is inserted into the lamp holder mounting groove 24*a* from an open end of the lamp bead mounting groove 24*a* to form the lamp holder 20 and to mount and position the lamp bead 30. In order to fix the lamp bead 30 and the connecting wire 40 well, the internal hollow structure of the lamp holder 20 is filled with packaging glue to fix the lamp bead 30 and the connecting wire 40. In order to clearly illustrate the internal structure of the lamp holder 20, the packaging glue is not drawn in FIGS. 11 and 12. As shown in FIG. 11, the plug-in matching structures are specifically characterized by the convex ribs 25*a* on both sides of the mounting plug-in plate 25 and the grooves on both sides of the lamp bead mounting groove 24*a*. Of course, the positions of the convex ribs 25*a* and the grooves may be interchangeable, and the plug-in matching structure may also be other conventional structures in the art.

The lamp holder 20 is improved from a left and right assembling mode in FIG. 5 into an integral structure design, product gaps are reduced, and the consistency of the product is improved, making the waterproof grade reach IP68, and improving the overall aesthetic sense.

As shown in FIG. 13, in Embodiment 5, the lamp bead 30 in the lamp holder 20 is connected to an external power storage compartment 50 by the connecting wire 40 that is drawn out from the lamp holder 20, supplying power to the lamp bead 30. The power storage compartment 50 is worn at the wrist of the hand of the user on which the finger sleeving member 10 is sleeved, and the power storage compartment 50 is worn through a wrist strap 53. A battery is fixed inside the power storage compartment 50, and a switch for controlling the lamp bead 30 is arranged on the power storage compartment 50. The switch is a touch control switch 51*a* or other forms of switch, such as a pushbutton switch.

In this embodiment, the lamp bead 30 protrudes from the outer surface of the lamp holder 20. Of course, the lamp bead 30 may also be completely hidden, e.g., flush with the outer surface of the lamp holder 20 or recessed on the outer surface of the lamp holder 20.

Those skilled in the art should understand that the present disclosure is not limited by the above-mentioned embodiments. The foregoing embodiments and descriptions described in the specification only illustrate the principle of the present disclosure. Without departing from the spirit and scope of the present disclosure, the present invention will also have various changes and improvements, and these changes and improvements fall into the scope of the present disclosure. The protection scope of the present disclosure is defined by the appended claims and their equivalents.

What is claimed is:

1. A finger lamp structure, comprising:

a finger sleeving member, wherein the finger sleeving member has a section of a closable or closed annular structure and is sleeved on a finger and provided with a mounting base on an outer surface in a circumferential direction;

a lamp holder, wherein the lamp holder is detachably connected to the mounting base, and the lamp holder is rotationally connected to the mounting base in a damping rotation connection manner; and a lamp bead, which is fixed on the lamp holder, wherein the size of an inner wall of the finger sleeving member that wraps the finger can be adjusted;

wherein the finger sleeving member is a closable annular structure and comprises a first connecting belt connected to one end of the mounting base and a second connecting belt connected to the other end of the mounting base; and a fastener is arranged at a free end of the second connecting belt, the first connecting belt is connected to the fastener, and at least one of contact surfaces between the fastener and the first connecting belt has non-slip ridges to achieve a damping connection between the first connecting belt and the second connecting belt.

2. The finger lamp structure according to claim 1, wherein a light-emitting part of the lamp bead protrudes from an outer surface of the lamp holder.

3. The finger lamp structure according to claim 1, wherein the fastener is a fixed frame fixed on an inner wall of the free end of the second connecting belt, the first connecting belt penetrates into the fixed frame, and a penetration distance is adjustable.

4. The finger lamp structure according to claim 1, wherein the fastener is a sliding block fixed on the inner wall of the free end of the second connecting belt; an outer wall of the first connecting belt is provided with a sliding groove that extends in its length direction; the sliding block is embedded into the sliding groove, and a position of the sliding block in the sliding groove is adjustable; and cross sections of the sliding groove and the sliding block are of a "convex" structure.

5. The finger lamp structure according to claim 1, wherein the finger sleeving member is of a closed annular structure, and an inner wall of the finger sleeving member is evenly distributed with elastic supporting plates, which extend toward the center, in the circumferential direction; and the elastic supporting plates undergo expansion, contraction or bending elastic deformation when in contact with fingers of different sizes.

6. The finger lamp structure according to claim 1, wherein the finger sleeving member is of a closed-loop annular structure, and the inner wall of the finger sleeving member is evenly distributed with elastic supporting belts in the circumferential direction; both ends of each elastic supporting belt are vertically connected to the inner wall of the finger sleeving member, and a middle part of each of the elastic supporting belts is of an arc-shaped structure that recesses in a direction away from the center of a circle; and when the middle parts of the elastic supporting belts are in contact with fingers of different sizes, the elastic supporting belts undergo an elastic deformation.

7. The finger lamp structure according to claim 1, wherein the finger sleeving member is made of a rubber material; the mounting base is provided with a circular mounting groove; and the bottom of the circular mounting groove extends in all directions to form a circular limiting groove;

a connecting column that matches the circular mounting groove is arranged at the bottom of the lamp holder, and a limiting flange that matches the circular limiting groove is arranged at the bottom of the connecting column; and a dimensional accuracy of the circular limiting groove and the limiting flange meets accuracy requirements of a detachable installation and damping rotation connection of the lamp holder.

8. The finger lamp structure according to claim 7, wherein the lamp holder comprises a first half shell and a second half shell which are assembled with each other; and matching step surfaces are provided on docking surfaces of the first half shell and the second half shell.

9. The finger lamp structure according to claim 8, wherein a first one of two docking surfaces of the limiting flange is provided with a limiting column that extends toward a second one of the two docking surfaces, and the second one of the two docking surfaces is provided with a limiting hole; and when the first half shell is docked with the second half shell, the limiting column penetrates into the limiting hole.

10. The finger lamp structure according to claim 8, wherein a first one of the docking surfaces of the first half shell and the second half shell is also provided with a guide wall that extends toward an inner wall of a second one of the docking surfaces of the first half shell and the second half shell, and a section of a free end of the guide wall is wedge-shaped.

11. The finger lamp structure according to claim 1, wherein the lamp holder is of an internal hollow structure, and an opening which is of an internal hollow structure is formed in the bottom of the lamp holder; and the lamp holder is divided into a lamp holder main body and a mounting plug-in plate which are of an integrated structure; the lamp holder main body is provided with a lamp bead mounting groove; the lamp bead mounting groove extends downward from a mounting position of the lamp bead and opens at the bottom of the lamp holder; plug-in matching structures that cooperate with each other are arranged at both sides of the lamp bead mounting groove and both sides of the mounting plug-in plate; the lamp bead is mounted into the lamp holder through the lamp bead mounting groove; the mounting plug-in plate is inserted into the lamp holder mounting groove from an open end of the lamp bead mounting groove to form the lamp holder and to mount and position the lamp bead; and the internal hollow structure of the lamp holder is filled with packaging glue to fix the lamp bead and a connecting wire.

* * * * *